United States Patent [19]

Puryear

[11] Patent Number: 4,585,183
[45] Date of Patent: Apr. 29, 1986

[54] BACKLASH CONTROL DEVICE FOR MAGNETIC BAIT CAST REEL

[75] Inventor: John W. Puryear, Tulsa, Okla.

[73] Assignee: Brunswick Corporation, Skokie, Ill.

[21] Appl. No.: 667,711

[22] Filed: Nov. 2, 1984

[51] Int. Cl.⁴ ............................................. A01K 89/02
[52] U.S. Cl. .............................. 242/84.52 B; 310/93; 310/105
[58] Field of Search ................... 242/84.52 B; 310/93, 310/105, 308, 309, 310

[56] References Cited

U.S. PATENT DOCUMENTS 2,293,748  8/1942  Johnson ......................... 242/84.52 B
4,011,510  3/1977  Olsen ..................................... 310/93

FOREIGN PATENT DOCUMENTS 58-65876  5/1983  Japan ........................... 242/84.52 B Primary Examiner—Billy S. Taylor
Attorney, Agent, or Firm—Wood, Dalton, Phillips Mason & Rowe

[57] ABSTRACT

An improved damping structure for a bait casting reel with magnetic spool damping structure. Fibers or the like are provided on a member associated with the spool and moving in a magnetic field and disrupt air flow in the magnetic field as the reel is operated. The resultant damping force on the spool is a combination of forces due to the rotation of the member in the magnetic field and the disruption of the air flow by reason of the placement of the fibers in the magnetic field.

15 Claims, 5 Drawing Figures

BACKLASH CONTROL DEVICE FOR MAGNETIC BAIT CAST REEL

DESCRIPTION

1. Technical Field

This invention relates to bait cast fishing reels which have freely rotatable spools during line payout and, more particularly, to structure for enhancing a magnetic damping force on the spool.

2. Background Art

A problem that has plagued the bait cast reel art is the problem of backlash and overrunning of the spool at the completion of a cast. To limit backlash and overrun, it is known to provide rotation retarding structure associated with the spool, that is otherwise freely rotatable during a cast.

One solution to the above problems is to damp the spool rotation magnetically. A structure exemplifying magnetic spool damping is shown in U.S. Pat. No. 2,361,239, to Ransom. In Ransom, an annular damping element projects laterally from the spool. A plurality of magnets are situated on the reel frame in such fashion as to create a magnetic field within which the annular damping element rotates. Movement of the damping element within the magnetic field sets up eddy currents tending to brake rotation of the line-carrying spool.

However, the amount of damping that can occur with the Ransom structure is limited. If substantially more damping is required with a structure such as that disclosed in Ransom, the magnetic force must be increased. This requires the provision of more and/or more powerful magnets to develop this desired retarding force. Accordingly, this can complicate assembly and thereby increase attendant costs as well as undesirably increase reel weight.

The present invention is specifically directed to overcoming these problems in a novel and simple manner.

SUMMARY OF THE INVENTION

This invention relates to an improved rotation damping structure for a freely rotatable line-carrying spool associated with a bait casting reel. The invention contemplates incorporation into a reel that provides a member following the spool and moving within a magnetic field. This magnetic field is normally established by providing magnets on the reel frame spaced radially with respect to the line-carrying spool. An air gap is provided between the magnets in the path of the moving body. Eddy currents develop which retard spool rotation.

According to the invention, fibers are provided on the member rotating with the spool and reside in the magnetic field in the air gap. The fibers disrupt air flow as the spool operates, as upon practicing a cast, and increase the damping force upon the spool over conventional magnetic damping structures.

The invention affords an inexpensive addition to a conventional-type reel and allows augmentation of the damping force without affecting the weight of the reel or the complexity of its construction. The invention essentially utilizes a magnetic potential that is not fully tapped with conventional reels employing magnetic damping.

In one preferred form, the member rotating within the field is flocked with a material to produce thin, flexible fibers, preferably made from either TEFLON or nylon.

DESCRIPTION OF THE PREFERRED EMBODIMENT

Figure 1:
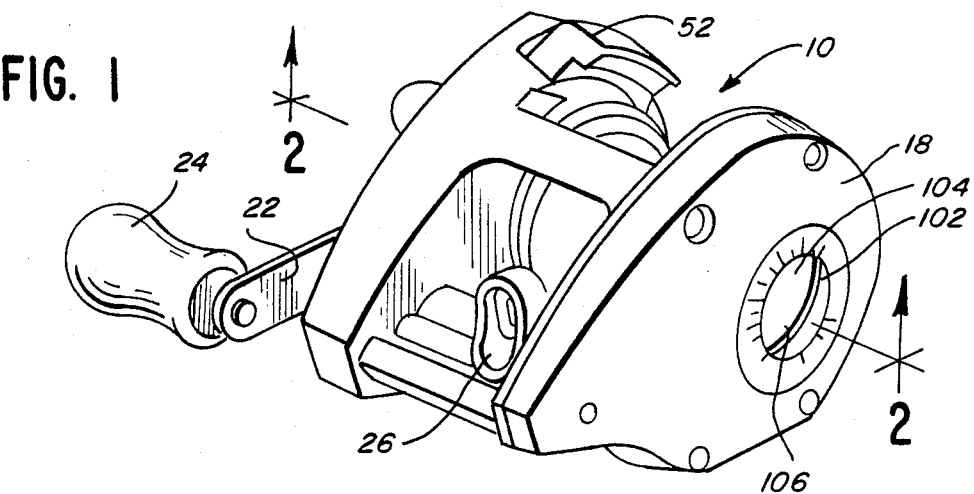
FIG. 1 is a perspective view of a bait cast reel which is suitable for incorporation of the present invention.
Figure 2:
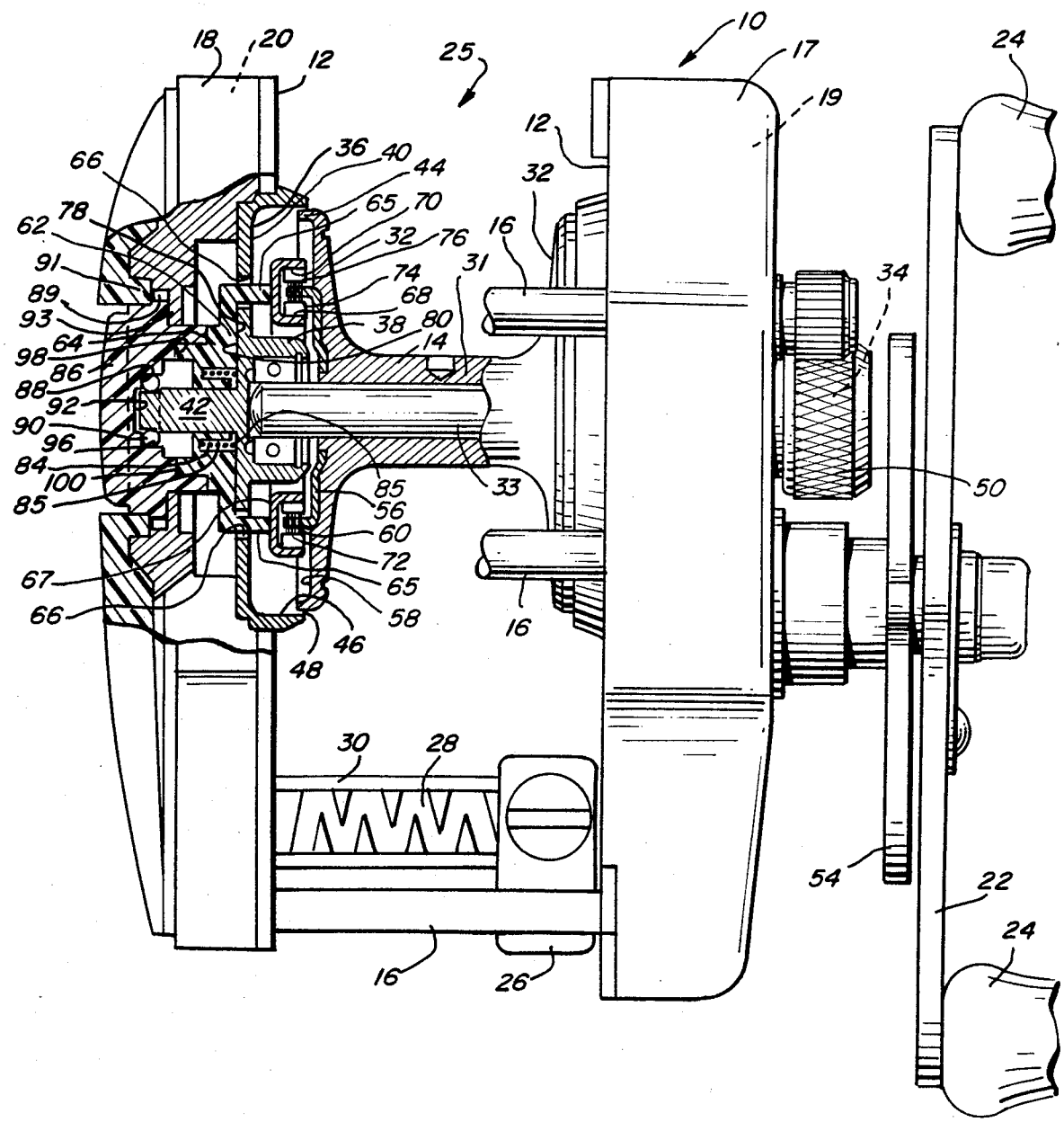
FIG. 2 is an enlarged, sectional view of the reel of FIG. 1 partially broken away along line 2—2 and illustrating spool rotation damping structure according to the present invention.

An exemplary bait casting reel, to which the present invention can be adapted, is illustrated in FIGS. 1 and 2 generally at 10. The reel 10 comprises a frame consisting of spaced plates 12 between which a spool 14 is journalled for rotation. The plates 12 are maintained in spaced apart relationship by posts 16 and encased by covers 17, 18 which enclose cavities 19, 20 respectively, within which the spool operating mechanism is contained.

Rotation of the spool 14 is effected through a crank handle 22 having associated knobs 24 which are grasped by the operator. The crank handle 22 is keyed to a shaft with an associated master gear (not shown) in mesh with a pinion gear (not shown) on the spool. Rotation of the crank handle in one direction causes the spool 14 to rotate in an opposite direction.

The plates 12 together bound a space 25 within which line wound upon spool 14 is confined. Line is directed onto the spool 14 by a level wind guide 26 meshed with reversely grooved spiral bar 28 surrounded by a split post 30 captured between the plates 12. The bar 28 is journalled for rotation within the plates 12 and has a gear (not shown) coacting with the aforementioned master gear associated with the crank handle 22. Rotation of the crank handle 22 effects reciprocative motion of the guide 26 which traverses between the plates 12 along the split post 30. The moving guide causes the line to be evenly distributed along the width of the spool during windup of the line.

The spool 14 comprises a line bearing core 31 having integral, enlarged, flange ends 32. The spool 14 is supported for rotation by a shaft 33 internally of the core 31. The free end of the shaft, adjacent the crank handle in cavity 19, is supported in a bearing structure 34. The wall 12 remote from the crank handle 22 has a cylindrical recess 36 and centrally thereof a cylindrical boss 38 which mounts the shaft end 33 for rotation. The wall 40 at the bottom of the recess 36 has an integral mounting post 42 with an axis coincident with the axis of the shaft 33. With the spool 14 in place, a laterally outwardly projecting rim 44 on the spool flange end 32 seats guidingly within the recess 36 and resides closely to the outer wall 46 of the recess 36 so that line cannot find its way through the gap 48 between the rim 44 and wall 46. A cap 50 on cover 17 and associated with the bearing structure 34, when tightened, draws against the shaft 33 of the spool 14 to take up excessive play of the spool.

To practice a cast, the operator depresses thumb button clutch release actuator 52 which allows the spool to freely revolve and pay out line, while the crank handle 22 remains stationary. Rotation of the crank handle returns the thumb button whereupon further rotation of the crank handle effects rotation of the spool and retrieval of the line. Drag adjustment for retrieval is accomplished by rotating star drag wheel 54. The structure associated with the reel drag is conventional and knowing its operation is not essential to an understanding of the instant invention. Further understanding of the overall reel operation can be gained from a study of Zebco, Co. reels in their commercially available "QUANTUM" line.

The present invention is concerned with structure for damping spool rotation to minimize backlash and overrunning of the spool as line is paid out as, for example, during a cast. Damping is accomplished magnetically in the exemplary structure in FIGS. 1 and 2. More specifically, a drag cup 56 is secured fixedly to the lateral face 58 associated with the flange end 32. The drag cup has a rim 60 opening laterally away from the spool. An adjustable damping member 62 has a body 64 on the outside of wall 40 and several integral lugs 65 (two being shown) extending through apertures 66 in the wall 40 and carries a damping ring 67 having a cup-shaped radial cross-section with radially spaced, facing annular surfaces 68,70. With the damping member 62 and spool 14 in place, the rim 60 of the drag cup 56 situates approximately midway between the facing annular surfaces 68,70.

A magnetic field is established in the gap 72 within which the rim 60 operates. This is accomplished by providing a series of complementary magnetic members 74,76 peripherally spaced about surfaces 68,70 on damping ring 67. The magnetic members 74,76 are paired radially with opposite polarization. The number of magnets employed is a matter of design choice, but the magnets should be peripherally spaced in a way to act uniformly on the rim 60 of the drag cup. The drag cup 56 and rim 60 are of soft iron or the like for maximizing the drag effect created by the magnetic field generated by the paired magnets 74, 76.

In operation, the rim 60 and cap 56 rotating with the spool and within the gap 72 cuts across the flux lines between the magnets 74, 76 with tends to resist rotation of the ring cup and spool. The greater the penetration of the rim 60 into the magnetic field, the greater is the resistance to rotation of the spool. The rotation of the rim in effect draws along and distorts the lines of flux in the magnetic field and sets up eddy currents that retard spool rotation. As the magnetic field is disrupted, i.e. as the spool rotates the rim 60 in the field, the applied resistance by the field to the rotation of the rim increases. The desired damping force can be adjusted by varying the extension of the rim within the magnetic field and in the air gap 72.

To accomplish this adjustment, the damping member 62 is made adjustable axially relative to the spool shaft 33. In a maximum damping position, a flat surface 78 on the damping member 62 facing toward the spool, facially abuts an outwardly facing flat surface 80 on the frame plate 12. In this position, the rim 60 of the drag cup 56 has its maximum extension into the magnetic field established between the magnets 74, 76 and the surfaces 68,70 of the damping ring 67.

The damping member 62 is normally biased away from the spool and away from the maximum damping position. A coil spring 82 is captured between the bottom edge 84 of an annular recess 85 in the damping member 62 opening toward the spool, and the flat surface 80 on the frame plate 12. To overcome the force in the coil spring 82, a damping adjustment knob 86 is provided and is accessible from the outside of the reel cover 18. The knob has an annular undercut 88 against which resilient O-ring 90 is seated. A blind bore 92 seats a reduced diameter end 94 of the mounting post 42 associated with the frame plate 12. By extending the end 94 of the post 42 into the bore 92, the O-ring 90 is compressed between the post 42 and the annular surface 96 bounding the undercut and frictionally retains the knob 86 upon the post 42. The knob 86 has a radial flange 89 which seats between the inner end of a circular flange 91 defining the opening for the knob 86 and a circular shoulder 93 on the cover 18. Relative axial movement between the post and knob is restricted, yet relative rotation can occur.

With the knob 86 seated on the post 42, ramp or cam surfaces 98 on the knob 86 are presented at oppositely ramped or cammed surfaces 100 on the damping member 62. Relative rotation between the damping member and knob effects a camming action so that the damping member is directed selectively axially toward or away from the spool. As this occurs, the amount of penetration by the rim 60 into the magnetic field established between the magnets 74, 76 on the surfaces 68,70 associated with the damping ring is varied. Each cam surface 98,100 extends over an arc of 180°. With the cam surfaces 98,100 in contact with each other, a 180° turn of the adjustment knob will produce a maximum axial movement of the damping member 62 and magnets 74,76 relative to the rim 60. Turning the knob moves the magnets 74, 76 and rim 60 relative to each other from a maximum penetration position of the rim in the field (as shown in FIG. 2) for a maximum resistance to rotation of the rim and spool to a minimum penetration position of the rim in the field for a minimum resistance to rotation of the rim and spool.

To facilitate rotation of the adjustment knob and to vary the damping on the spool, the outwardly facing surface 102 of the knob 86 has a cup-shaped indentation 104 bisected by a straight gripping rib 106. The indentation facilitates placement of the operator's fingers about the rib to effect rotation.

Figure 3:
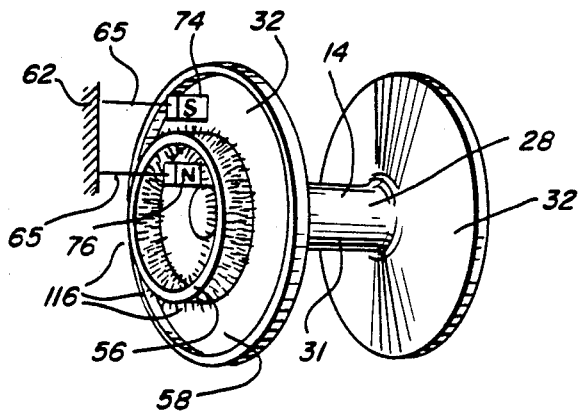
FIG. 3 is a perspective view of the spool from the reel in FIGS. 1 and 2, with the present invention incorporated.
Figure 5:
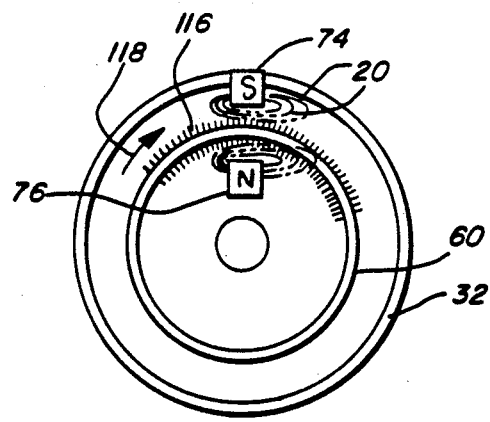
FIG. 5 is a side view of the spool of FIG. 3 demonstrating the effect of rotation of the spool upon lines of flux in a magnetic field.

In FIGS. 3 and 5, the spool 14 comprising the core 31 and enlarged flange ends 32 from FIGS. 1 and 2 is isolated and viewed in perspective from one end, whereat the invention is incorporated. The magnets establishing the magnetic field in the gap 72 are designated schematically by poles 74,76 with designations "S" and "N", respectively, on radially opposite sides of the drag cup rim 60 and in radial alignment with each other. According to the invention, radially extending fibers 116 project both inwardly and outwardly from the rim 60 of the drag cup 56. The fibers situate in the path of the flux lines established by the magnetic field and augment the damping accomplished by rotation of the rim 56 alone in the magnetic field. The fibers on the rim cause a resistance to rotation of the rim by means of the drag created by the fibers trying to sweep through the air in the air gap. The fibers agitate the air flow in the vicinity of the rim as the rim and fibers rotates in the air gap 72. In addition, the magnetic lines of flux tend to follow the air flow while bending to match the area offered between the rim 60 and the magnetic members 74, 76. The effects of increased damping afforded by both the rotation of the rim within the magnetic field and the disruption of the air flow by the fibers are complementary to substantially increase damping over the same structure absent the fibers. It should be noted that a similar structure on the damping ring 67 in association with the rim to disrupt the air flow would function according to the invention. This can be accomplished by locating fibers or the like on either or both surfaces 68,70 of the ring 67.

The combined effects of rotating the fiber coated rim in the magnetic field is demonstrated in FIG. 5. The direction of rotation of the spool in indicated by arrow 118. As the spool rotates, the flux lines 120, shown schematically, tend to distort and elongate in the direction of rotation, in effect bending to follow movement of the rim 60. The interruption or agitation of the air flow by the fibers 116 and the effect on the flux lines 120 is shown by designating the flux path with broken lines.

Figure 4:
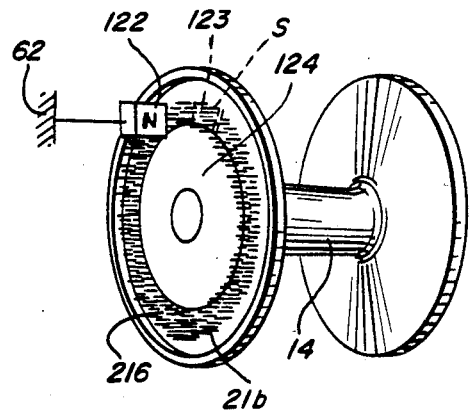
FIG. 4 is a perspective view of an alternative spool construction embodying the invention.

The concept of air flow interruption by the provision of fibers or the like in the path of lines of magnetic flux established by a magnetic source, while demonstrated with cooperating annular members, is not so limited. The invention relates more broadly to the concept of situating a structure to intersect the path of the flux lines to enhance the magnetic attraction on the rotating member and therefore to enhance damping. For example, in FIG. 4, a plurality of axially facing magnets 122 are shown schematically attached to the damping member 62 whereby the magnets can be moved toward and away from a mating plurality of magnets 123 on the end wall 124 of end face 32 of the spool 14 to close and open the air gap between said magnets 122 and said magnets 123. The close or small air gap produces a greater resistance to rotation of the spool. Fibers 216 are secured to the wall 124 and extend perpendicular to the wall 124 and parallel to the axis of the spool. The fibers 216 project into the air gap between the magnets 122 on the damping member 62 and the magnets on the wall 124 of the spool. As the spool rotates, the fibers add resistance to the rotation of the spool and together with the effect of the fibers on the lines of magnetic flux increases the resistance to rotation of the spool more so than the magnetic resistance alone.

The fibers 116,216 might be chemically treated to be electrically conductive to enhance the eddy current flow. The fibers could be graphite material or another material that would be electrically conductive. The fibers could be 0.003 to 0.008 of an inch in diameter and 0.010 to 0.020 of an inch in length.

A further modification of the invention would provide for the magnets 74,76 to bridge the rim 60 of the drag cup 56 with the fibers 116 projecting transverse to the surface (inward and outward) of the rim. With the modification going to the opening and closing of the magnet gap by moving the magnets radially inward or outward together relative to each other, the opening of the gap between the magnets 74, 76 reduces the resistance to drag on the spool. The magnetic resistance, the air resistance caused by the fibers, and the skewing of the magnetic field all combine to increase the drag in the spool.

The provision for attachment of the fibers to the spool can be accomplished in any known manner, such as flocking or the like. The fibers can be attached by treating the surfaces of the flange 56 and adhering to the treated surface a strip of material having the transverse fibers projecting therefrom. A typical strip of material would be the male portion of a Velcro type fastener, which strip could be glued to the surfaces of the flange 56 so that the projecting elements would be the fibers 116. The described orientation of the fibers is intended to be generally accurate. Deviation by numerous of the fibers from the described orientation is contemplated.

It should be understood that the foregoing detailed description was made for purposes of demonstrating the structure and operation of the present invention, with no unnecessary limitations to be understood therefrom.

I claim:

1. An improved bait casting reel of the type having a fixed frame, a line-carrying spool mounted for rotation relative to the fixed frame, an operating handle to effect rotation of the spool and thereby retrieve fishing line that is paid out and means for releasing the spool so that the line can pay out from the spool as during casting, the improvement comprising:

a first damping member fixed against rotation relative to the frame;

means associated with the first damping member for establishing a magnetic field in an air gap adjacent the first damping member and comprising first and second spaced apart magnetic field producing elements;

a second damping member fixed against rotation relative to the line-carrying spool and having at least a portion extending into the magnetic field in the air gap, whereupon rotation of the line-carrying spool causes relative rotational movement between the first and second damping members and movement of said damping member portion in the magnetic field so that eddy currents are set up, producing a damping force tending to slow down the rotation of the line-carrying spool; and a plurality of elongate fibers attached to at least one of either the first or second damping member, extending into the magnetic field in the air gap, movable directly between the first and second field producing elements as the reel is operated and disrupting air flow within the gap.

said fibers, by disrupting the air flow, enhancing rotational damping of the line-carrying spool so that the likelihood of backlash and overrunning of the spool during casting is substantially diminished.

2. The improved bait casting reel according to claim 1, wherein means are provided to adjust the amount of extension of the means associated with the second damping means into the magnetic field in the air gap and thereby the amount of damping of the spool.

3. An improved bait casting reel of the type having a fixed frame, a line-carrying spool mounted for rotation relative to the fixed frame, an operating handle to effect rotation of the spool and thereby retrieve fishing line that is paid out and means for releasing the spool so that line can pay out from the spool as during casting, the improvement comprising:

a first damping member fixed against rotation relative to one of either the frame or line-carrying spool;

means associated with the first damping member for establishing a magnetic field in an air gap adjacent the first damping member;

a second damping member fixed against a rotation relative to the other of either the frame or line-carrying spool and having at least a portion extending into the magnetic field in the air gap, whereupon rotation of the line-carrying spool causes relative rotational movement between the first and second damping members and movement of said second damping member portion in the magnetic field so that eddy currents are set up, producing a damping force tending to slow down the rotation of the line-carrying spool; and a plurality of fibers attached to the second damping means, extending into the magnetic field in the air gap and disrupting air flow within the gap, said fibers, by disrupting the air flow, enhancing rotational damping of the line-carrying spool so that the likelihood of backlash and overrunning of the spool during casting is substantially diminished.

4. The improved bait casting reel according to claim 3 wherein the fibers are made from TEFLON or nylon.

5. The improved bait casting reel according to claim 3 wherein the fibers are chemically coated to be electrically conductive.

6. The improved bait casting reel according to claim 3 wherein the fibers are electrically conductive.

7. The improved bait casting reel according to claim 3 wherein the fibers have a diameter within the range of 0.003 to 0.008 of an inch and a length within the range of 0.010 to 0.020 of an inch.

8. An improved bait casting reel of the type having a fixed frame, a line-carrying spool mounted for rotation relative to the fixed frame and having a laterally extending core and enlarged laterally spaced flanges in fixed relationship to the core, an operating handle to effect rotation of the spool and thereby retrieve fishing line that is paid out and means for releasing the spool so that line can pay out from the spool as during casting, the improvement comprising:

a first damping member fixed against rotation relative to the frame and having an associated portion with first and second surfaces spaced radially with respect to the spool and defining an air gap between the first and second surfaces;

means for establishing a magnetic field in the air gap;

a second damping member substantially fixedly associated with one of the spool flanges for rotation therewith and having a laterally projecting rim extending into the magnetic field in the air gap, said rim having surfaces facing radially oppositely with respect to the spool and moving within the magnetic field in the air gap upon rotation of the line-carrying spool and causing eddy currents to be set up in the second damping member which tend to damp rotation of the line-carrying spool;

means associated with at least one of the first and second surfaces and rim and projecting radially into the magnetic field in the air gap, said means projecting from the rim comprising a plurality of fibers directed generally radially with respect to the spool from at least one of the rim surfaces; and means for adjusting the amount of extension of the rim within the magnetic field in the air gap and thereby the extent of damping of the spool, said means projecting from the rim disrupting air flow in the air gap upon rotation of the line-carrying spool and enhancing rotational damping of the line-carrying spool so that the likelihood of backlash and overrunning of the spool during casting is substantially diminished.

9. The improved bait casting reel of claim 8 wherein means are provided to adjust the first damping member axially with respect to the spool to vary the extension of the rim within the magnetic field and thereby choose a desired amount of damping.

10. The improved bait casting reel of claim 7 wherein the fibers are made from a flexible material.

11. The improved bait casting reel of claim 8 wherein fibers are provided on both of the radially oppositely facing rim surfaces.

12. The improved bait casting reel as claimed in claim 7 wherein the fibers are electrically conductive.

13. An improved bait casting reel of the type having a fixed frame, a line-carrying spool mounted for rotation relative to the fixed frame, an operating handle to effect rotation of the spool and thereby retrieve fishing line that is paid out and means for releasing the spool so that line can pay out from the spool as during casting, the improvement comprising:

a first damping member fixed against rotation relative to the frame;

first means associated with the first damping member for establishing a magnetic field in the air gap between the first damping member and the line-carrying spool;

a second damping member fixed against rotation relative to the line-carrying spool and having a least a portion extendable into the magnetic field;

the line-carrying spool rotating the second damping member relative to the first damping member with the portion of said damping member moving in the magnetic field so that a damping force is developed tending to slow down the rotation of the line-carrying spool;

second means distinct from the second damping means for extension into the magnetic field in the air gap to disrupt air flow within the gap;

third means attaching the second means to the second damping means so that the second means follow movement of the second damping means in the magnetic field, said second means, by disrupting the air flow, enhancing rotational damping of the line-carrying spool so that the likelihood of backlash and overrunning of the spool during casting is substantially diminished;

spring means captured between the first damping member and the frame for biasing the first damping member laterally away from the spool;

an adjustment knob having a cam surface;

said first damping member having a cam surface coacting with the cam surface on the adjusting knob; and means mounting the knob for rotation on the frame, said knob being selectively rotatable to cause interaction of the cam surfaces on the knob and first damping member to laterally shift the first damping member relative to the reel frame and thereby select a desired damping.

14. An improved bait casting reel of the type having a fixed frame, a line-carrying spool mounted for rotation relative to the fixed frame and having a laterally extending core and enlarged laterally spaced flanges in fixed relationship to the core, an operating handle to effect rotation of the spool and thereby retrieve fishing line that is paid out and means for releasing the spool so that line can pay out from the spool as during casting, the improvement comprising:

a surface on one of the flanges of the line-carrying spool facing laterally toward the frame and in conjunction with the frame laterally bounding an air gap;

means establishing a magnetic field in the air gap between the frame and the one flange and damping rotational movement of the spool; and a plurality of substantially laterally directed fibers projecting from the flange surface into the air gap causing interruption of air flow in the gap upon rotation of the line-carrying spool, whereby rotational damping of the line-carrying spool is enhanced so that the likelihood of backlash and overrunning of the spool during casting is substantially diminished.

15. The improved bait casting reel of claim 14 wherein said fibers are made from a flexible material.

* * * * *